United States Patent

[11] 3,543,901

| [72] | Inventors | Karl Lengsfeld<br>Plankstadt;<br>Willi Konzet, Neckarhausen, Germany |
|---|---|---|
| [21] | Appl. No. | 761,956 |
| [22] | Filed | Sept. 24, 1968 |
| [45] | Patented | Dec. 1, 1970 |
| [73] | Assignee | Frankl & Kirchner, Fabrik Fur<br>Elecktromotoren Und Elektrische Apparate<br>Schwetzingen/Baden, Germany |
| [32] | Priority | Sept. 27, 1967 |
| [33] | | Germany |
| [31] | | No. 1,625,715 |

[54] ELECTROMAGNETIC FRICTION ARMATURE WITH VIBRATION DAMPER
8 Claims, 4 Drawing Figs.

[52] U.S. Cl. .................................................. 192/107,
192/84; 188/1, 188/218
[51] Int. Cl. ...................................................... F16d 27/04

[50] Field of Search................................. 192/107(V.D.);
84, 84(A), 84(B); 188/1(B), 218(A)

[56] References Cited
UNITED STATES PATENTS

| 2,739,683 | 3/1956 | Gamundi...................... | 192/(V.D.) |
| 3,160,549 | 12/1964 | Caldwell....................... | 188/1(B) |
| 3,189,150 | 6/1965 | Chapman ..................... | 192/84(A) |
| 3,378,116 | 4/1968 | Hennig.......................... | 188/1(B) |

Primary Examiner—Benjamin W. Wyche
Attorney—Robert H. Jacob

ABSTRACT: Electromagnetic friction coupling or brake where a friction layer is provided on a relatively rigid flat supporting surface 10 or insert 9 and/or the resilient support of the armature ring 5 is provided on the side remote from the friction surface with a damping layer or cover 6 stiffened by a relatively rigid flat cover layer 7 or an insert.

Patented Dec. 1, 1970

3,543,901

Inventors:
KARL LENGSFELD
AND WILLI KONZET
BY Robert H Jacob
AGT.

3,543,901

ELECTROMAGNETIC FRICTION ARMATURE WITH VIBRATION DAMPER

BACKGROUND OF THE INVENTION

The present invention relates to electromagnetic friction couplings or brakes. More in particular, the invention is concerned with electromagnetic friction couplings or brakes where the armature ring is carried by resilient means. In electromagnetic friction couplings or brakes whose armature ring is supported by an axially resilient disk or an axially resilient arm star or spider, there frequently occur disturbing noises similar to whistle sounds at the beginning of the coupling or braking engagement.

It has been found that these noises cannot be eliminated to a satisfactory extent, neither by the change of the roughness of the surfaces of the cooperating friction surfaces, nor by radial interruptions at one or the other friction surface nor by changing the material of one or the other surface. The disturbing noises arise especially with friction layers of cork which, owing to its oil and heat resistance as well as to its relatively limited OF THE INVENTION resulting consistency of shape must preferably be used for such friction couplings and friction brakes.

SUMMARY OF THE INVENTION

It is an object of the invention to provide for effective elimination of such noises, in that in accordance with the invention the friction layer is provided with a noise suppression means in the form of a relatively rigid flat support base of insert and/or the resilient carrier or support of the ring armature is provided with a noise suppression means in the form of a noise suppression layer reinforced by a relatively rigid flat cover or insert.

Each of the two possible forms of construction is effective, but it is also possible to use both of them together.

The friction layer as well as also the suppression means or layer consist preferably of cork. The reinforcing underlying layer or covering can be made of sheet metal, although a sufficiently stiff nonmetallic material, for example plastic material, is also suitable for this purpose.

Further advantageous features and objects of the invention will become apparent from the following description with reference to the embodiments illustrated in the drawings in which.

Figures 1, 2, 3, 4:
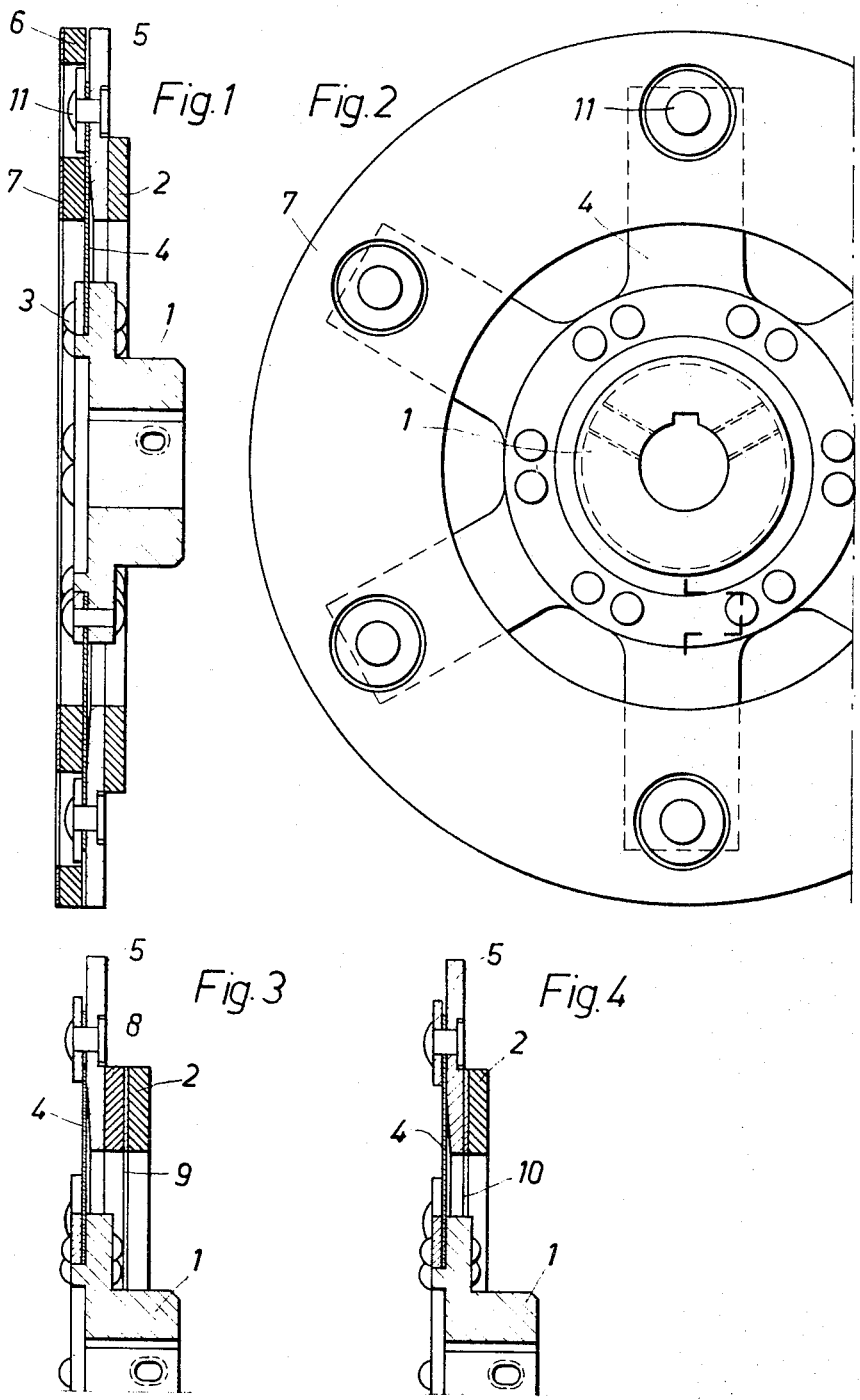
FIG. 1 is an axial section.
FIG. 2 is an end or plan view of a coupling or braking disk provided with a damping layer at the resilient support.
FIG. 3 is an axial section through an embodiment having a rigid insert in the friction layer.
FIG. 4 is a similar axial section through an embodiment having a rigid support for the friction layer.

The hub 1 of the friction disk in accordance with FIGS. 1 and 2 carries an arm star or spider 4 of sheet steel which is connected to it by means of rivets 3 and whose arm ends are riveted to the armature ring 5. A cork ring 2 is connected with the armature ring 5 which serves as a friction layer. At the reverse side of the armature ring a further cork ring 6 serving as a damping layer is glued upon the arm star and upon it on its outer surface a noise suppressing element such as a sheet metal ring 7 is glued. The sheet metal ring 7 has the same surface area dimensions as the cork ring 6 and circular cut outs at the rivet locations 11.

Tests have established that the cork layer 6 would not be sufficient for suppressing the disturbing noises without the reinforcing ring 7. On the other hand, the cork layer 6 in combination with the sheet metal ring 7 provides for complete noise suppression.

In the place of the cork layer it would also be possible to use noise suppressing material which is commercially available, but that is not heat resistant and not oil resistant, and therefore may only be used where the aforementioned qualities are not required.

In the embodiment in accordance with FIG. 3 a cork layer 8 is glued onto the armature ring 5, then a noise suppressing element in the form of a thin sheet metal ring 9 and onto that again the coupling or braking layer 2 which likewise consists of cork. The sheet metal ring 9 is in a way an insert in the friction layer that is composed of two layers of cork particles 2 and 8.

In accordance with FIG. 4 a noise suppressing element in the form of a thin nonmetallic ring 10, for example of stiff plastic material, is glued onto the armature ring 5, and onto it the friction layer 2 is glued. The element or ring 10 prevents free transmission of the elastic vibrations that occur in the cork layer 2 onto the armature ring 5 in which connection it is suspected that the layer of agglutinate material disposed between the latter and ring 10 in its turn cooperates in a damping manner.

Having now described the invention with respect to the embodiments illustrated in the drawings, what I desire to protect by letters patent is set forth in the appended claims.

We claim:

1. In an electromagnetic friction coupling, friction brake means and the like, of the type having a resilient support, an armature ring axially resiliently supported by said support, and a friction layer on one side of said armature ring, noise suppression means comprising a relatively rigid, flat, noise suppressing element in the form of an annular disk of sheet metal, plastic or the like applied by means of an agglutinant on one side of said armature ring remote from the outer surface of said friction layer.

2. Coupling and brake means in accordance with claim 1, where said element is disposed between said friction layer and said armature, and said support is a resilient spider.

3. Coupling and brake means in accordance with claim 1, where said element is disposed as an insert in said friction layer and said support is a resilient spider.

4. Coupling and brake means in accordance with claim 1, comprising said resilient support as a spider, a layer of damping material on said armature, said noise suppressing element being glued onto said damping material and said friction layer being glued onto said element.

5. Coupling and brake means in accordance with claim 4, where said damping material is of the same material as said friction layer.

6. Coupling and brake means in accordance with claim 3, where said element supports said friction layer on one side and is glued onto said armature with its other side.

7. In an electromagnetic friction coupling, friction brake means and the like, of the type having an axially resiliently disposed armature ring secured to a spider and a friction layer on one side of said armature ring, noise suppression means comprising a relatively rigid, flat, noise suppressing element, a member of damping material such as cork mounted on the other side of said armature on said spider, said flat, noise suppressing element being glued to said member of damping material.

8. Coupling and brake means in accordance with claim 7, where said element is in the form of a stiffening support and is made of stiff material such as thin sheet metal, plastic or the like.